United States Patent Office 2,989,511
Patented June 20, 1961

2,989,511
CATALYTIC POLYMERIZATION OF TRIOXANE
Arthur W. Schnizer, Corpus Christi, Tex., assignor to Celanese Corporation of America, New York, N.Y., a corporation of Delaware
No Drawing. Filed Dec. 23, 1958, Ser. No. 782,411
12 Claims. (Cl. 260—67)

This invention relates to the catalytic polymerization of trioxane and particularly to the polymerization of trioxane in the presence of materials which were not previously known to be catalytic for the polymerization.

The polymerization of trioxane to produce tough high molecular weight polymers is known. In application Serial No. 691,143, filed October 21, 1957, by Donald E. Hudgin and Frank M. Berardinelli, there is disclosed a method of polymerizing trioxane in the presence of a coordinate complex of boron trifluoride with an organic compound in which element of the group consisting of oxygen and sulfur is the donor atom.

I have now found that tough high molecular weight polymers may be obtained by polymerizing trioxane in the presence of a coordinate complex of boron fluoride with an organic compound of the group consisting of basic trivalent nitrogen and phosphorus compounds having ionization constants in water at 25° C. not higher than about $1 \times 10^{-9}$; that is, in water, these organic compounds form bases by reaction with the water, which bases have ionization constants not higher than about $1 \times 10^{-9}$. Preferably the ionization constant is not higher than about $1 \times 10^{-11}$.

In one advantageous mode of operation, the polymerization takes place in molten trioxane at atmospheric pressure. However, the temperature of the reaction may vary from about $-10°$ to about 180° C. and the trioxane may be in solid or vapor phase at the temperature extremes.

The trioxane may be polymerized as the sole monomer in the system or it may be copolymerized with minor amounts (from about 0.1 to about 15 mole percent) of other monomers, such as other cyclic ethers having at least two adjacent carbon atoms, preferably in the presence of a catalyst comprising a boron fluoride coordinate complex in which oxygen or sulfur is the donor atom. In general, the cyclic ethers which may be used are of the formula

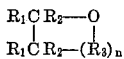

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and $n$ is an integer from zero to two.

The preferred cyclic ethers used in the preparation of the desired copolymers are ethylene oxide and 1,3-dioxolane which may be designated by the formula

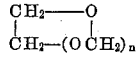

where $n$ is an integer from zero to two. Other cyclic ethers which may be used are 1,4-dioxane, trimethylene oxide, tetramethylene oxide, pentamethylene oxide, 1,2-propylene oxide, 1,2-butylene oxide, 1,3-butylene oxide and 2,2-di(chloromethyl) 1,3-propylene oxide.

The copolymers produced from the preferred cyclic ethers have a structure substantially composed of oxymethylene and oxyethylene groups in a ratio from about 6 to 1 to about 1000 to 1.

The copolymers produced are normally solid having melting points from somewhat lower than up to the melting point of the corresponding polyoxymethylene homopolymer, the preferred copolymers having melting points not less than 150° C. The copolymers have a weight loss when maintained in an open vessel at a temperature of $225 \pm 5°$ C. for 120 minutes not greater than 40 weight percent, as contrasted with the homopolymer which has a weight loss in excess of 80 weight percent.

The catalysts of the instant invention are effective in producing such copolymers.

The coordinate complexes of boron fluoride used in accordance with this invention include complexes with aryl amines, such as aniline, $\alpha$-naphthylamine, $\beta$,naphthylamine, diphenylamine and benzidine, complexes with heterocyclic nitrogen compounds, such as pyridine and phenothiazine; amino acids, such as glycine and $\alpha$-alanine; hydrazides, such as semicarbazide and amides such as urea.

The coordinate complexes with phosphorus-containing compounds include complexes with phosphine or organic phosphines such as alkyl and aryl phosphines, e.g. triphenyl phosphine and triethyl phosphine.

The coordinate complexes of boron fluoride may be made in conventional manner, as by bubbling boron fluoride into the nitrogen or phosphorus compound, which may be dissolved in an inert solvent.

In the coordinate complexes, the weight ratios of the boron fluoride and the nitrogen- or phosphorus-containing compounds are generally approximately stoichiometric, based on one mol of boron fluoride per atom of basic nitrogen or basic phosphorus. When the nitrogen- or phosphorus-containing compound is in molar excess, the yields and molecular weights are reduced.

The coordinate complex of boron fluoride should be present in the polymerization zone in amounts such that its boron fluoride content is between about 0.0001 and about 1.0 weight percent based on the weight of trioxane in the polymerization zone. Preferably, amounts between about 0.0001 and about 0.1 weight percent should be used.

The trioxane in the reaction zone is preferably anhydrous or substantially anhydrous. Moisture will reduce the yield and molecular weight of the polymer.

In one method of preparation, the trioxane is maintained as a molten body at a temperature between about 64° and 90° C. A measured amount of coordinate complex of boron fluoride, such as boron fluoride-diphenylamine complex, may be added with vigorous stirring. The desired polymer is produced rapidly.

Another advantageous procedure involves the polymerization of trioxane in a solution of about 10 to about 70 weight percent in a solvent, such as benzene or cyclohexane. Catalyst is added in the proportion stated above, based on the weight of trioxane in solution. The polymer comes out of solution as it is formed. A complete description of this method of procedure may also be found in application Serial No. 691,145, filed October 21, 1957, by Donald E. Hudgin and Frank M. Berardinelli. The catalysts of the present invention are effective in polymerization in accordance with the solution polymerization procedure of the aforementioned application. For solution polymerization, the preferred temperature range is between about 40° and 80° C.

In still another advantageous procedure, the trioxane is suspended in amounts between about 25 and 75 weight percent in an inert liquid such as normal decane which is at least partially a non-solvent therefor. Catalyst in the amount specified above is added and solid polymer is quickly formed in the suspended trioxane. A complete description of this method of procedure may be found in application Serial No. 691,142, filed October 21, 1957, by Hudgin and Berardinelli. The catalysts of this invention are effective in suspension polymerization in accordance with the suspension polymerization procedure of the aforementioned application.

The polymerization period may vary from about 30 seconds to about 4 hours, with shorter periods being associated with bulk polymerization and longer periods with solution polymerization.

The polymer, after formation, is washed clean of monomer, if any, catalyst and solvent or suspension medium if any. When there is no solvent or suspension medium one or more water washes will generally suffice. Where a solvent or suspension medium is used, the polymer is generally washed in accordance with the procedure of the Hudgin and Berardinelli application Serial No. 718,147, filed February 28, 1958, that is first with a catalyst neutralizing agent, such as an aliphatic amine, then with an organic solvent such as ether, and then finally washed with water. Aliphatic amines used as catalyst neutralizing agents have dissociation constants much higher than $1 \times 10^{-9}$.

The washed polymer is thermoplastic and may be molded by known techniques. They may, for example, be compression molded at 180° C. for two minutes to produce tough, molded objects.

Example I

Trioxane was polymerized in the molten state at 86° C. in the presence of boron fluoride-diphenylamine complex, $(C_6H_5)_2NH.BF_3$, as a catalyst. The amount of catalyst was sufficient to provide for 0.01 weight percent of boron fluoride, based on the weight of the trioxane. The reaction time was less than one minute.

The polymer was purified by washing twice with boiling water and then with acetone at room temperature to displace the water, and then dried. The polymer was produced in a yield of 72% and has an inherent viscosity of 0.90 when measured in a 0.5% by weight solution in p-chlorophenol containing 2% by weight of $\alpha$-pinene at 60° C. The thermal degradation rate at 222° C. was 0.98 weight percent per minute for the first 55% of the polymer and 0.35 weight percent for the remainder. Thermal degradation rates at 222° C. are determined on a 1 gram sample suspended in a glass ampule in methyl salicylate vapors. The ampule is open through a capillary tip.

Example II

The above polymerization was repeated with the boron fluoride complex of alpha-naphthylamine as the catalyst and at a temperature of 75° C. The reaction time was 12 minutes. The polymer was recovered as above.

The polymer was produced in a yield of 50 weight percent. The thermal degradation rate, measured as above, was 4.5 weight percent per minute for the first 70% of the polymer and 0.56 weight percent for the remainder.

It is to be understood that the foregoing detailed description is given merely by way of illustration and that many variations may be made therein without departing from the spirit of my invention.

Having described my invention, what I desire to secure by Letters Patent is:

1. A process for preparing high molecular weight polymers which comprises polymerizing trioxane in the presence of a small catalytic amount of a coordinate complex of boron fluoride with an organic compound of the group consisting of basic trivalent nitrogen and phosphorus compounds having ionization constants in water at 25° C. not higher than about $1 \times 10^{-9}$.

2. A process for preparing high molecular weight polymers which comprises polymerizing trioxane in the presence of a small catalytic amount of a coordinate complex of boron fluoride with an aromatic amine having an ionization constant in water at 25° C. not higher than about $1 \times 10^{-9}$.

3. A process for preparing high molecular weight polymers which comprises polymerizing trioxane in the presence of a small catalytic amount of a coordinate complex of boron fluoride with an organic phosphine having an ionization constant in water at 25° C. not higher than about $1 \times 10^{-9}$.

4. A process for preparing high molecular weight polymers which comprises polymerizing trioxane for a period not greater than 4 hours in the presence of a small catalytic amount of a coordinate complex of boron fluoride with an aromatic amine having an ionization constant in water at 25° C. not higher than about $1 \times 10^{-9}$.

5. The process of claim 4 wherein said polymerization takes place at a temperature between about −10° and 180° C.

6. The process of claim 4 wherein said complex is present in an amount such that the boron fluoride content is from about 0.0001 to about 1.0 weight percent based on the weight of trioxane.

7. A process for preparing high molecular weight polymers which comprises polymerizing trioxane in the presence of a small catalytic amount of a coordinate complex of boron fluoride with diphenylamine.

8. A process for preparing high molecular weight polymers which comprises trioxane in the presence of a small catalytic amount of a coordinate complex of boron fluoride with alpha naphthylamine.

9. The process of claim 1 wherein said polymerization takes place in molten trioxane.

10. The process of claim 1 wherein said polymerization takes place in a solution comprising 10 to 70 weight percent of trioxane.

11. The process of claim 10 wherein said polymerization takes place at a temperature between about 40° and 80° C.

12. A process for preparing high molecular weight polymers comprises polymerizing trioxane in the presence of a coordinate complex of boron fluoride with diphenylamine in an amount such that its boron fluoride content is between about 0.0001 and about 0.1 weight percent based on trioxane.

References Cited in the file of this patent

UNITED STATES PATENTS

| 2,142,980 | Huijser et al. | Jan. 3, 1939 |
| 2,270,135 | Mikeska et al. | Jan. 13, 1942 |
| 2,795,571 | Schneider | June 11, 1957 |
| 2,936,298 | Hudgin et al. | May 10, 1960 |

OTHER REFERENCES

Walker: "Formaldehyde," A.C.S. Monograph #120 (1953), pp. 114 and 146–153.